United States Patent [19]

Gerhardt et al.

[11] 4,298,568

[45] Nov. 3, 1981

[54] METHOD AND COMPOSITION FOR INHIBITING CORROSION OF NONFERROUS METALS IN CONTACT WITH WATER

[75] Inventors: Werner Gerhardt; Volker Wehle, both of Hilden; Andreas Syldatk, Dusseldorf; Gabriele Rogall, Neukirchen-Vluyn; Jürgen Reiffert, Oberhausen; Jens Conrad, Hilden, all of Fed. Rep. of Germany

[73] Assignee: Henkel Kommanditgesellschaft auf Aktien, Dusseldorf-Holthausen, Fed. Rep. of Germany

[21] Appl. No.: 177,898

[22] Filed: Aug. 14, 1980

[30] Foreign Application Priority Data

Aug. 25, 1979 [DE] Fed. Rep. of Germany ....... 2934461

[51] Int. Cl.³ .................... C23F 11/06; C23F 11/16; C23F 11/12; C23F 11/14
[52] U.S. Cl. ................................ 422/16; 252/389 R; 252/389 A; 252/390; 252/392; 422/13; 422/15; 422/17; 422/19
[58] Field of Search ...................... 422/15, 16, 17, 19, 422/13; 252/389 R, 389 A, 390, 392

[56] References Cited

U.S. PATENT DOCUMENTS

| | | | |
|---|---|---|---|
| 2,941,953 | 6/1960 | Hatch | 422/16 X |
| 3,261,844 | 7/1966 | Trotimenko | 252/389 R X |
| 3,639,406 | 2/1972 | Reimlinger et al. | 252/390 X |
| 3,663,448 | 5/1972 | Ralston | 422/15 X |
| 3,891,568 | 6/1975 | Nishio et al. | 252/389 A X |
| 3,935,125 | 1/1976 | Jacob | 252/389 A X |
| 4,066,398 | 1/1978 | Hwa | 422/16 X |
| 4,089,796 | 5/1978 | Hams et al. | 422/16 X |
| 4,149,969 | 4/1979 | Robitaille et al. | 422/16 X |
| 4,209,487 | 6/1980 | Hogue et al. | 422/16 X |

FOREIGN PATENT DOCUMENTS 495434 8/1970 Switzerland .
1222133 2/1971 United Kingdom .

Primary Examiner—Barry Richman
Attorney, Agent, or Firm—Hammond & Littell, Weissenberger and Muserlian

[57] ABSTRACT

A method for inhibiting corrosion of nonferrous metals in contact with circulating water comprising the steps of adding to circulating water in contact with non-ferrous metals from 0.05 to 10 gm/m$^3$ of at least one 3-amino-5-alkyl-1,2,4-triazole wherein said alkyl has from 2 to 8 carbon atoms and adjusting said water to a pH of from 6 to 10; as well as corrosion inhibiting compositions containing said 3-amino-5-alkyl-1,2,4-triazole.

10 Claims, No Drawings

METHOD AND COMPOSITION FOR INHIBITING CORROSION OF NONFERROUS METALS IN CONTACT WITH WATER

BACKGROUND OF THE INVENTION

The subject matter of the invention is the use of 3-amino-5-alkyl-1,2,4-triazoles, hereafter called AAT for short, to prevent corrosion of nonferrous metals in aqueous, particularly industrial water, systems.

Because of their corrosion resistance, nonferrous metals, such as copper, brass, bronze, etc., are preferred materials in the construction of water-conveying plants, for example, steam generating plants, heating systems, cooling water circulating systems and the like. These materials are of particular importance for condenser tubes in steam power plants. Despite their relatively good resistance to corrosion, it is unavoidable, however, that analytically determinable amounts of copper will be given off to the surrounding water in normal use. These copper traces become cemented onto the following cooling water pipes of steel or other base materials, and cause pitting corrosions which are sometimes disastrous. For this reason an additional treatment of the water coming in contact with the nonferrous metal is technically important to reduce this copper transfer. In practice, there are very few inhibitors which are suitable for this purpose. Essentially, these are mercaptobenzthiazole, benzotriazole and tolyltriazole. These compounds are relatively effective as inhibitors of copper corrosion, but they have the great disadvantage that they are chemically relatively difficult to produce and thus can find only limited application for economical reasons. Another disadvantage of the above-mentioned compounds is their very poor solubility at acid pH values, so that a practical manufacture of these products is difficult.

OBJECTS OF THE INVENTION

An object of the present invention is to develop compositions and methods to prevent the corrosion of non-ferrous metals in water-conveying systems.

Another object of the present invention is the development of a method for inhibiting corrosion of non-ferrous metals in contact with circulating water comprising the steps of adding to circulating water in contact with nonferrous metals from 0.05 to 10 gm/m³ of at least one 3-amino-5-alkyl-1,2,4-triazole wherein said alkyl has from 2 to 8 carbon atoms and adjusting said water to a pH of from 6 to 10.

A further object of the present invention is the development of a corrosion inhibitory composition for use in water-conveying systems in contact with nonferrous metals consisting essentially of from 0.1% to 90% by weight of at least one 3-amino-5-alkyl-1,2,4-triazole wherein said alkyl has from 2 to 8 carbon atoms, from 5% to 50% by weight of at least one concretion prevention agent and/or dispersion agent, from 0 to 50% by weight of a water-soluble zinc salt, from 0 to 10% by weight of a water-soluble complexing phosphonic acid, and from 0 to 94.5% by weight of water.

These and other objects of the invention will become more apparent as the description thereof proceeds.

DESCRIPTION OF THE INVENTION

According to the present invention, it was found that 3-amino-5-alkyl-1,2,4-triazoles can be used with excellent results as a corrosion inhibitor for nonferrous metals in aqueous systems in a pH range of 6 to 10. Suitable are particularly compounds whose alkyl has 2 to 8, preferably 5 to 7, carbon atoms.

More particularly, the present invention relates to a method for inhibiting corrosion of nonferrous metals in contact with circulating water comprising the steps of adding to circulating water in contact with nonferrous metals from 0.05 to 10 gm/cm³ of at least one 3-amino-5-alkyl-1,2,4-triazole wherein said alkyl has from 2 to 8 carbon atoms and adjusting said water to a pH of from 6 to 10; as well as a corrosion inhibitory composition for use in water-conveying systems in contact with nonferrous metals consisting essentially of from 0.1% to 90% by weight of at least one 3-amino-5-alkyl-1,2,4-triazole wherein said alkyl has from 2 to 8 carbon atoms, from 5% to 50% by weight of at least one concretion prevention agent and/or dispersion agent, from 0 to 50% by weight of a water-soluble zinc salt, from 0 to 10% by weight of a water-soluble complexing phosphonic acid, and from 0 to 94.5% by weight of water.

The discovery that 3-amino-5-alkyl-1,2,4-triazoles are excellent corrosion inhibitors for nonferrous metals is quite remarkable since other, similarly constituted, triazoles are chemically unsuitable in practice, or do not provide any corrosion protection at all.

In a test with an addition of 0.3 ppm triazole compound, the corrosion protection in the case of 3-amino-1 H-1,2,4-triazole, as well as 5-amino-1 H-1,2,4-triazole-3-carboxylic acid, was only 50% and 40%, respectively, while in the same test with the addition of 3-amino-5-pentyl-1,2,4-triazole a value of 88% was obtained. 5-Methyl-benzotriazole and benzotriazolyl-1-acetic acid provided practically no corrosion protection at all.

The amounts of AAT that are preferably added to the aqueous system range from 0.05 to 10 gm/m³, particularly 0.1 to 0.5 gm/m³. The production of AAT is effected according to known methods, for example, by reacting aliphatic carboxylic acids with aminoguanadine-hydrogen-carbonate. The production of AAT is not the subject of the invention.

In practice, the presence or formation of deposit-forming or turbidity-causing substances, like hardness precipitations, clay substances and iron hydroxides, play an important role in the corrosion behavior of an aqueous system or of industrial water. By preventing these deposits, the corrosive behavior of a water is further improved. It is, therefore, generally of advantage to add to the water to be treated additional known concretion preventing agents and dispersing agents, apart from AAT. Suitable such additions are particularly polyacrylic acid or acrylic acid-methacrylic acid copolymerizates with an average molecular weight of between 500 and 4,000, in the form of their alkali metal salts or ethylene oxide-propylene oxide block polymers with an average molecular weight of between 500 and 3,000, and an ethylene oxide-propylene oxide ratio of 10:90 to 30:70.

The above-mentioned concretion preventing agents and dispersing agents are used in combination with AAT in amounts of 1 to 50 gm/m³, preferably 3 to 10 gm/m³.

If ecological aspects are of no concern, particularly in cooling systems, AAT can also be used in combination with water-soluble zinc salts and/or phosphorus-containing compounds.

Particularly zinc chloride and zinc sulfate can be used as zinc salts. Amounts of 0.5 to 10 gm/m³, preferably 1 to 4 gm/m³ (calculated as zinc) are used, corresponding to an amount of 0.5 to 10 ppm, preferably 1 to 4 ppm.

In particular, complexing phosphonic acids can be used as phosphorus-containing compounds, such as 1-hydroxyethane-1,1-diphosphonic acid, aminotrimethylenephosphonic acid, and 2-phosphono-butane-1,2,4-tricarboxylic acid, as well as their water-soluble salts or mixtures of these compounds. These compounds are employed in the same amounts as the zinc salts. Such a combination can considerably increase the corrosion protection.

The following examples are illustrative of the practice of the invention without being limitative thereof.

EXAMPLE 1

The corrosive behavior was determined according to the following method:

Three carefully cleaned copper test plates (75×12×1.5 mm) were dipped at room temperature for 24 hours into a 1-liter beaker containing 1 liter of water and the indicated amount of the substances being tested. During the test period, the aqueous solutions were stirred at 100 rpm in a series arrangement of ten beakers per test. Subsequently, the Cu-content in the water was determined by means of atom absorption.

The test water used as a corrosive medium had the following analytical data:
8° dH (calcium hardness)
2° dH (magnesium hardness)
1° dH (carbonate hardness)
1,000 ppm (Cl⁻)
8.2 pH.

The test results are given below in Table I.

TABLE I

| Substance | Dosage ppm | Material of Test Plate | μ gm/Cu |
|---|---|---|---|
| — | — | Brass | 2,010 |
| AAT* | 0.3 | Brass | 62 |
| Tolyltriazole | 0.3 | Brass | 117 |
| Mercaptobenzthiazol | 0.5 | Brass | 126 |
| — | — | Copper | 892 |
| AAT* | 0.3 | Copper | 46 |
| Benzotriazole | 0.3 | Copper | 69 |

*3-Amino-5-heptyl-1,2,4-triazole

These results demonstrate the very great corrosion inhibiting effect of AAT.

EXAMPLE 2

A technical cooling system with a volume of 1.2 m³ and a circulation of 8 m³/hr was operated with Dusseldorf, Germany, city water. The evaporation losses were compensated by the addition of fresh water to such an extent that the salt content does not exceed twice the original value. The system contained a heat exchanger of brass. Without any anticorrosion treatment of the circulating water, the copper content in the system was 240 μgm/liter.

After the addition of the corrosion inhibitor according to the invention (3-amino-5-pentyl-1,2,4-triazole) in amounts of 0.5 gm/m³, based on the circulating water, the copper content was reduced to 40 μgm/liter. This value must be considered excellent.

EXAMPLE 3

In a long-time test over four weeks, 3-amino-5-heptyl-1,2,4-triazole was tested together with other inhibitors, and the corrosion rates were determined on a copper pipe by pumping the test water under identical conditions through a test zone. The arrangement consisted of a 5-liter storage vessel having an outlet at the bottom connected to the intake of a speed-adjustable pump. The pump outlet fed to the test copper pipe and thereafter through a rotameter and back to the 5-liter storage vessel.

The test conditions were as follows:
Water composition:
8° dH (calcium hardness)
2° dH (magnesium hardness)
1° dH (carbonate hardness)
500 mg/liter (Cl⁻)
8.2 pH.
Velocity of flow:
1,250 liter/hr corresponding to 1 m/s.
Test temperature:
Start: 15° C.
End: 30° C.

Two liters of test water were discharged daily and replaced by water treated with the substance according to the invention.

The following inhibitor combination was added to the water in an amount of 50 gm/m³:
2.8% Hydroxyethane diphosphonic acid
20.0% Zinc chloride
10.0% Of a dispersing agent (low molecular weight copolymers of acrylic acid-methacrylic acid, molar weight 1,000)
0.7% 3-Amino-5-heptyl-1,2,4-triazole
Balance Water After fourteen days of water circulation, the copper content was 24 μgm/liter which must be considered excellent.

A comparison test, in which the substance according to the invention was replaced by mercaptobenzthiazole, yielded clearly poorer, though technically still acceptable, values of 35 μgm/liter.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A method for inhibiting corrosion of non-ferrous metals in contact with circulating water comprising the steps of adding to circulating water in contact with nonferrous metals from 0.05 to 10 gm/m³ of at least one 3-amino-5-alkyl-1,2,4-triazole wherein said alkyl has from 2 to 8 carbon atoms and adjusting said water to a pH of from 6 to 10.

2. The method of claim 1 wherein said alkyl has from 5 to 7 carbon atoms.

3. The method of claim 1 or 2 wherein said 3-amino-5-alkyl-1,2,4-triazole is employed in an amount of from 0.1 to 0.5 gm/m³.

4. The method of claim 1 wherein a water-soluble zinc salt is also added to said circulating water.

5. The method of claim 4 wherein said water-soluble zinc salt is added to said circulating water in such amounts as to supply from 0.5 to 10 gm/m³ of Zn⁺⁺ ions.

6. The method of claim 4 wherein said water-soluble zinc salt is added to said circulating water in such amounts as to supply from 1 to 4 gm/m³ of Zn⁺⁺ ions.

7. The method of claim 1 wherein a concretion preventative and dispersion agent is also added to said circulating water.

8. The method of claim 7 wherein said concretion preventative and dispersion agent is a member selected from the group consisting of an alkali metal polyacrylate having an average molecular weight of between 500 and 4,000, an alkali metal salt of a copolymerizate of acrylic acid and methacrylic acid having an average molecular weight of between 500 and 4,000, and an ethylene oxide/propylene oxide block polymer having an average molecular weight of between 500 and 3,000 and an ethylene oxide:propylene oxide ratio of from 10:90 to 30:70.

9. The method of claim 8 wherein said concretion preventative and dispersion agent is added to said circulating water in an amount of from 1 to 50 gm/m$^3$.

10. The method of claim 8 wherein said concretion preventative and dispersion agent is added to said circulating water in an amount of from 3 to 10 gm/m$^3$.

* * * * *